(12) United States Patent
Triplett et al.

(10) Patent No.: US 10,809,455 B2
(45) Date of Patent: Oct. 20, 2020

(54) LASER WRITTEN WAVEGUIDES WITH MODE TAPERING, DIFFERACTIVE EXPANSION AND THREE-DIMENSIONAL ROUTING

(71) Applicant: Dolby Laboratories Licensing Corporation, San Francisco, CA (US)

(72) Inventors: Mark Thomas Triplett, Livermore, CA (US); Dzhakhangir V. Khaydarov, Campbell, CA (US); Xiaozhen Xu, Sunnyvale, CA (US); Gennady Imeshev, Irvine, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/329,609

(22) PCT Filed: Aug. 28, 2017

(86) PCT No.: PCT/US2017/048952
§ 371 (c)(1),
(2) Date: Feb. 28, 2019

(87) PCT Pub. No.: WO2018/044811
PCT Pub. Date: Mar. 8, 2018

(65) Prior Publication Data
US 2019/0235164 A1    Aug. 1, 2019

Related U.S. Application Data

(60) Provisional application No. 62/380,619, filed on Aug. 29, 2016.

(30) Foreign Application Priority Data

Aug. 29, 2016   (EP) .................................... 16186161

(51) Int. Cl.
*G02B 6/12*        (2006.01)
*G02B 6/02*        (2006.01)
(Continued)

(52) U.S. Cl.
CPC ..... *G02B 6/12002* (2013.01); *G02B 6/02361* (2013.01); *G02B 6/02376* (2013.01);
(Continued)

(58) Field of Classification Search
CPC ............ G02B 6/12002; G02B 6/02376; G02B 6/02361; G02B 6/125; G02B 6/1228;
(Continued)

(56) References Cited

U.S. PATENT DOCUMENTS 9,594,220 B1 *   3/2017   Sutherland ............... G02B 6/30
10,288,808 B1 *  5/2019   Pitwon ................... G02B 6/138
(Continued)

FOREIGN PATENT DOCUMENTS

WO        2016/003931        1/2016

OTHER PUBLICATIONS

Stoian, R. et al., "Ultrafast laser photoinscription of large-mode-area waveguiding structures in bulk dielectrics Invited paper for the section . Hot topics in Ultrafast Lasers", Optics and Laser Technology, Elsevier Science, Publishers BV., Amsterdam, NL, XP029416788, ISSN: 0030-3992, DOI :10 .1016/J . OPTLASTEC. 2015.11.025 Section 3.4 "Structured waveguides" on p. 102 figures 6a-c, vol. 80, Jan. 12, 2016 (Jan. 12, 2016), pp. 98-103.
(Continued)

Primary Examiner — Ryan A Lepisto
Assistant Examiner — Erin D Chiem

(57)    ABSTRACT

A laser-written waveguide comprising, an optical substrate having a first refractive index, a plurality of laser-written tracks buried within the optical substrate and having a second refractive index lower than the first refractive index,
(Continued)

one or more concentric geometric regions bounding the plurality of laser-written tracks and a waveguide channel delimited by said concentric geometric regions, wherein said waveguide channel is configured to allow formation of an optical mode.

14 Claims, 13 Drawing Sheets

(51) Int. Cl.
*G02B 6/125* (2006.01)
*G02B 6/122* (2006.01)
*G02B 6/13* (2006.01)
*G02B 6/14* (2006.01)
*G02B 6/124* (2006.01)

(52) U.S. Cl.
CPC .......... *G02B 6/125* (2013.01); *G02B 6/1225* (2013.01); *G02B 6/1228* (2013.01); *G02B 6/02371* (2013.01); *G02B 6/13* (2013.01)

(58) Field of Classification Search
CPC .... G02B 6/1225; G02B 6/13; G02B 6/02371; G02B 6/12; G02B 6/14; G02B 6/124; G02B 6/122
See application file for complete search history.

(56) References Cited

U.S. PATENT DOCUMENTS

| | | | |
|---|---|---|---|
| 10,395,686 B2* | 8/2019 | Gallo | G11B 7/131 |
| 10,564,441 B2* | 2/2020 | Psaila | B23K 26/082 |
| 2002/0076655 A1* | 6/2002 | Borrelli | G11C 13/041 |
| | | | 430/321 |
| 2004/0161709 A1* | 8/2004 | Schroeder | B23K 26/0853 |
| | | | 430/321 |
| 2007/0263974 A1* | 11/2007 | Khrushchev | C30B 29/20 |
| | | | 385/141 |
| 2012/0039567 A1* | 2/2012 | Herman | G02B 6/124 |
| | | | 385/37 |
| 2017/0070293 A1* | 3/2017 | Chang | H04B 10/2581 |
| 2018/0024292 A1* | 1/2018 | Beausoleil | G02B 6/13 |
| | | | 385/14 |

OTHER PUBLICATIONS

Simon, Gross. et al., "Fabrication of fully integrated antiresonant reflecting optical waveguides using the femtosecond laser direct-write technique", Optics Letters, Optical Society of America, vol. 38, No. 11, Jun. 1, 2013 (Jun. 1, 2013), pp. 1872-1874.
Robert, Keil. et al., "All-optical routing and switching for three-dimensional photonic circuitry", Scientific Reports, vol. 1:94, Sep. 15, 2011 (Sep. 15, 2011), pp. 1-6.
Ophelie, Caulier. et al., "Direct laser writing of buried waveguide in As2S3 glass using a helical sample translation", Optics Letters, Optical Society of America, vol. 38, No. 20, Oct. 15, 2013 (Oct. 15, 2013), pp. 4212-42159.
C. D' Amico, et al., "Large-mode-area infrared guiding in ultrafast laser written waveguides in Sulfur-based chalcogenide glasses", Optics Express, vol. 22, No. 11, May 22, 2014 (May 22, 2014), p. 13091.
Cheng, G. et al., "Large mode area waveguides with polarization functions by vol ume ultrafast laser photoinscription of fused silica", Optics Letters, Optical Society of America, vol. 38, No. 11, Jun. 1, 2013 (Jun. 1, 2013), pp. 1924-1926.

* cited by examiner

LASER WRITTEN WAVEGUIDES WITH MODE TAPERING, DIFFERACTIVE EXPANSION AND THREE-DIMENSIONAL ROUTING

TECHNOLOGY

The present disclosure relates generally to optical waveguides. More particularly, an embodiment of the present disclosure relates to buried, laser written waveguides in optical substrates.

BRIEF DESCRIPTION OF THE DRAWINGS

An embodiment of the instant disclosure is illustrated by way of example, and not in way by limitation, in the figures of the accompanying drawings and in which like reference numerals refer to similar elements and in which.

SUMMARY

Figure 1A:
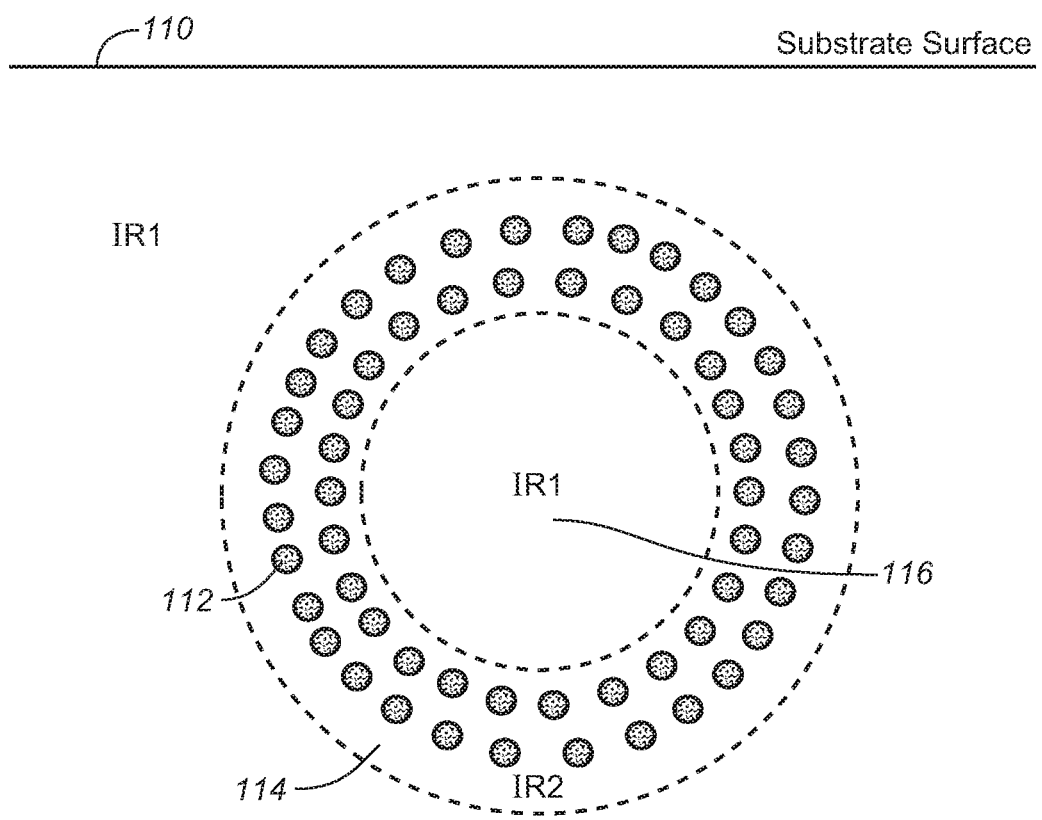
FIGS. 1A and 1B depicts a circular cross-section and a hexagonal cross-section of buried optical channels in accordance with an embodiment of the disclosure.

In a first aspect of the disclosure, a laser-written waveguide comprising, an optical substrate having a first refractive index, a plurality of laser-written tracks buried within the optical substrate and having a second refractive index lower than the first refractive index, one or more concentric rings bounding the plurality of laser-written tracks and a waveguide channel delimited by said concentric rings, wherein said waveguide channel is configured to allow formation of an optical mode. The one or more concentric rings may be said to contain the plurality of laser-written tracks. The one or more concentric rings may have a non-uniform cross-sectional size along a length of the waveguide channel. The laser-written tracks may have constant cross-sectional size (e.g., diameter) along the length.

In a second aspect of the disclosure, a laser-written waveguide comprising, an optical substrate having a first refractive index, a plurality of laser-written tracks buried within the optical substrate and having a second refractive index lower than the first refractive index, one or more concentric geometric regions (polygonal or elliptical, including circular or ring-shaped) bounding the plurality of laser-written tracks and a waveguide channel delimited by said concentric geometric regions, wherein said waveguide channel is configured to allow formation of an optical mode. The one or more concentric geometric regions may be said to contain the plurality of laser-written tracks. The one or more concentric geometric regions may have a non-uniform cross-sectional size along a length of the waveguide channel. For example, the cross-sectional size of the one or more concentric geometric regions may monotonously increase from an input of the laser-written waveguide to an output of the laser-written waveguide, or may monotonously decrease from the output of the laser-written waveguide to the input of the laser-written waveguide. The laser-written tracks may have constant cross-sectional size (e.g., diameter) along the length.

In a third aspect of the disclosure, a laser-written waveguide comprising, an optical substrate having a first refractive index, a plurality of laser-written tracks buried beneath a surface of the optical substrate and having a second refractive index lower than the first refractive index, one or more concentric rings bounding the plurality of laser-written tracks and a waveguide channel delimited by said concentric rings having a non-uniform cross-sectional size along the length, wherein said waveguide channel is configured to allow formation of an optical mode with varying mode size along the length.

In a fourth aspect of the disclosure, a laser-written waveguide comprising, an optical substrate having a first refractive index, a plurality of laser-written tracks buried beneath a surface of the optical substrate and having a second refractive index lower than the first refractive index, one or more concentric rings bounding the plurality of laser-written tracks and a waveguide channel delimited by said concentric rings having a non-uniform cross-sectional size and multiple sections each with constant track number along the length, wherein said waveguide channel is configured to allow formation of an optical mode with varying mode size along the length. For example, a first section among the multiple sections may have a different track number than a second section among the multiple sections. In general, at least first and second sections among the multiple sections may have different track numbers. The sections' track numbers may depend on the sections' cross-sectional sizes (e.g., mean cross-sectional sizes). For examples, the track number of the laser-written waveguide along its length may increase with increasing cross-sectional size, and vice versa.

In a fifth aspect of the disclosure, a laser-written waveguide comprising, an optical substrate having a first refractive index, a plurality of laser-written tracks buried inside of the optical substrate and having a second refractive index lower than the first refractive index, one or more concentric rings bounding the plurality of laser-written tracks and a waveguide channel delimited by said concentric rings having a non-uniform cross-sectional size and three dimensional routing along the length, wherein said waveguide channel is configured to allow formation of an optical mode with varying mode size along the length and arbitrary input and output locations.

In a sixth aspect of the disclosure, a laser-written waveguide comprising, an optical substrate having a first refractive index, a plurality of laser-written tracks buried beneath a surface of the optical substrate having a second refractive index lower than the first refractive index and an abrupt ending point offset from a facet of the optical substrate, one or more concentric rings bounding the plurality of laser-written tracks and a waveguide channel delimited by said concentric rings, wherein said waveguide channel is configured to allow formation of an optical mode with an abrupt termination of the optical mode at a location (e.g., designed location) before the facet of the optical substrate.

DESCRIPTION OF EXAMPLE EMBODIMENTS

Waveguides in optical substrates play an important role in many fields including telecommunications, photonics, and nonlinear optics. In nonlinear optics, waveguides allow for increased efficiencies for nonlinear optical processes when compared to the same process carried out with focused beams in bulk optical materials. This increase is due to the high achievable intensities in waveguides and to the increased effective interaction length facilitated by the guided mode. Utilizing waveguides in nonlinear optical materials can allow for achieving high conversion efficiency for processes like second harmonic generation, finding a direct application in high power visible laser systems for next generation cinema projection systems.

Buried waveguides in optical materials can be created by localized modification of the material creating tracks with a lower refractive index than the bulk material which when aggregated properly can form an optical mode. By selectively focusing a pulsed laser to a single location within an optical substrate and allowing one or more pulses of the laser to propagate and encounter the substrate, a localized material modification can be achieved which reduces the refractive index within the focal volume at that location. The shape of the modified volume can be adjusted between ellipsoidal and spherical by adjusting the numerical aperture, the pulse length. By linking many such locations of lowered refractive index along arbitrary paths with controllable overlap, tracks can be created. Creating tracks of modified material in this way is herein also referred to as "writing" tracks, and the pulsed laser creating the tracks is referred to as the "writing laser". By aggregating these tracks in such a way to create confining cross-sectional geometry (e.g. ring, elliptical, or polygonal shapes), it is possible to create a cladding region (with a lower refractive index than the bulk) within the substrate which supports the formation of an optical mode which is localized inside an unmodified central core. The concentric geometric regions may have a non-uniform cross-sectional size along a length of the waveguide channel. The laser-written tracks may have constant cross-sectional size (e.g., diameter) along the length.

In one example an optical waveguide is buried in a lithium tantalate substrate (LT). Lithium tantalate is crystalline, has a large second order optical non-linearity, accessible through quasi-phase-matching, allowing for efficient wavelength conversion, and its favorable material properties allow for high power handling. It is envisioned that the optical substrate may be crystalline or amorphous and may have linear or non-linear optical properties.

Many factors influence the size of the optical mode including, the size of concentric geometric structures delimiting the unmodified material region, the number, shape and relative placement of adjacent laser written tracks which are bounded by the geometric regions, the overlap between modified material volume elements along the tracks, the pulse energy and repetition rate of the writing laser, and the speed that the sample is translated under the writing laser. The mode size along the waveguide propagation direction may be controlled by changing a combination of one or more of these effects.

In a specific embodiment, a waveguide may have an abrupt termination point at a specific distance away from an output facet of the optical substrate to allow for diffractive expansion of the mode towards the output facet. This allows for one to engineer the optical intensity of a beam encountering the facets of the optical substrate.

The instant disclosure may allow for more efficient coupling between arbitrarily dissimilar optical devices coupled to an input and/or output of an optical chip, may allow combining of an arbitrary number of optical channels from one optical device to another, may allow greater control over various intra-waveguide optical effects, by controlling mode sizes in different regions of the waveguide and may mitigate facet damage due to optical power density reduction.

The input and output locations may be at different space coordinates. The different space coordinates may be different from one another in any of the three coordinate axes. Arbitrary three-dimensional routing of laser written tracks allows for close spatial grouping of modes at input or output locations which can facilitate launching of optical power from many channels or waveguides into a single optical device which, for example, could be a large diameter multimode fiber.

EXAMPLES

Figure 1B:
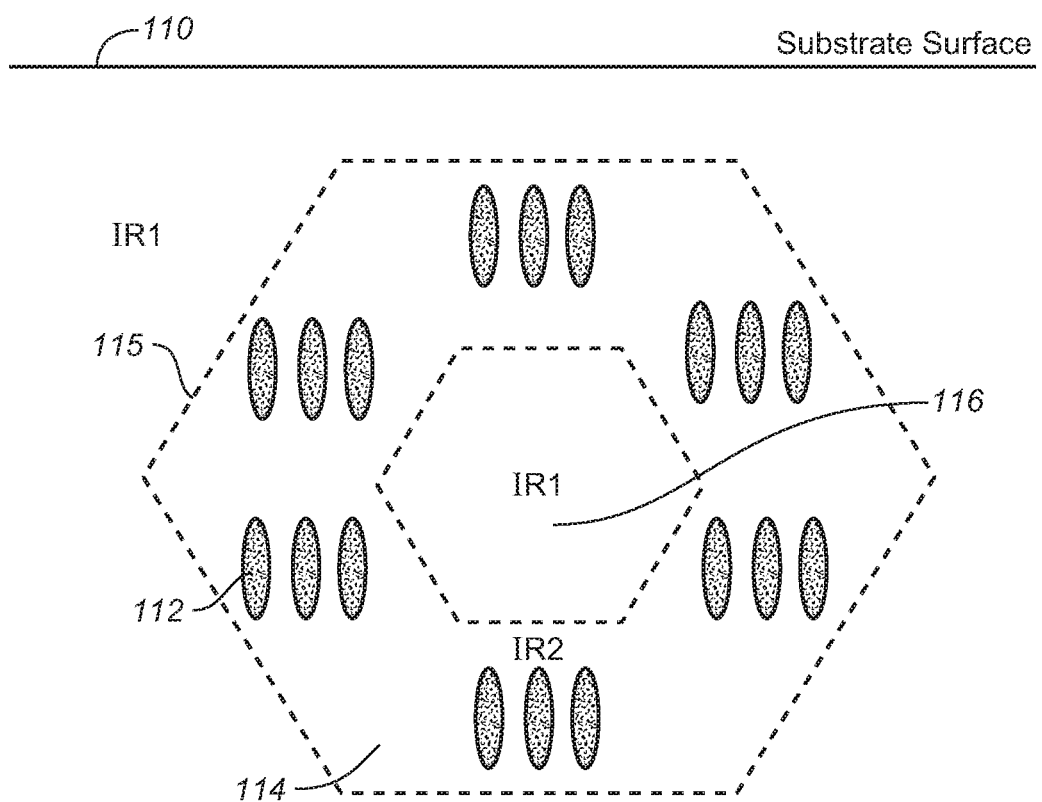

The cross-sections of exemplary buried waveguides are shown schematically in FIGS. 1A and 1B. It is to be understood that the cross-sections shown are examples and that the disclosure is not limited to particular cross-sectional shapes, the number of tracks, track shapes, cross-sectional size (e.g., diameter) of the tracks or relative track placement. The waveguide structure is written directly in the substrate material. The optical substrate (e.g. LT) 110 has a first index of refraction IR1. A laser modifies tracks 112 of the substrate along tracks through the material which run normal to the cross-sectional plane. The refractive index in the modified track region of the substrate is reduced to the second refractive index IR2. These laser modified tracks 112 may be aggregated in a pattern that can be bounded by concentric geometric shapes and whose collective influence is to confine an optical mode to the central region 116 inside the concentric geometric shapes. The central region 116 is the waveguide core and is unmodified having the original refractive index IR1. The modified tracks are located beneath the surface of the substrate and buried within the substrate. The cross-sectional geometrical regions 114 can have arbitrary shapes such as, for example, a circular, elliptical, and polygonal, such as hexagonal 115 and in combination with the central region 116 unmodified core forms a buried optical waveguide. The laser modified tracks 112 may have constant cross-sectional size (e.g., diameter) along the length, for example. The laser modified tracks 112 may be aggregated to form a single or multi-layered pattern as in this example. The tracks may be written from the bottom to the top and from left to right. The layering of the tracks allows deep complex structures to be built and allows an unobstructed view for the laser as it lowers the refractive index of the substrate material.

Permanent material modification, e.g. lowering the refractive index, may occur when a laser pulse from a femtosecond laser is focused under the surface of the substrate 110 to a region with a diameter of few microns. The laser modified region may have an oblong, elliptical or circular shape, see for example laser modified tracks 112 in FIGS. 1A, 1B and 12. The substrate may be physically moved in a direction perpendicular to the femtosecond laser beam propagation direction, resulting in a continuous laser modified region track. In other words, a plurality of laser modified tracks 112 may be traced in a pattern which constitutes a waveguide. The modified region tracks may be constructed from the region farthest from the substrate surface toward the substrate surface in layers and may be created from left to right or right to left depending upon the build.

The process of fabricating buried waveguides may comprise creating modified tracks under the substrate surface with a femtosecond laser. The femtosecond laser processing parameters may be selected to produce a consistent modified track while avoiding material fracture in the vicinity of the track. To obtain consistent waveguide performance, femtosecond laser and system parameter adjustment may be made to: scan speed, overlap, number of passes, pulse length, repetition rate, wavelength, polarization, focusing conditions, cross-sectional geometry, and the like.

A waveguide channel may be formed by arranging many closely-spaced circular shaped laser modified tracks 112 in a circular pattern, with spacing between the tracks comparable to the individual track size, an example of which is illustrated in FIG. 1A. In general, in any of the disclosed embodiments and examples, the spacing between the tracks may be comparable to the individual track size. Here, comparable shall mean that the spacing is between half and twice the individual track size (e.g., diameter, or mean diameter).

A hexagonal cross-section of an exemplary buried waveguide is shown schematically in FIG. 1B. The waveguide structure is written directly in the substrate material. The optical substrate 110 has a first refractive index IR1. A laser modifies tracks 112 of the substrate and induces a second refractive index IR2 lower than the first refractive index in a pattern such that a hexagonal boundary region 115 can be drawn. Within this region is a central region 116 unmodified core having the original first refractive index IR1. The modified area being located beneath the surface of the substrate and buried within the substrate. When the modified tracks are placed proximate to one another, the combined effects of the tracks form an optical channel in the core. The tracks may be situated in sub-groups each with an equal distance to the center of the core 116, which are groups of three in this example.

The optical mode is situated in the central region 116 unmodified substrate material inside the modified concentric structure having a first refractive index IR1 which is the same as the substrate. Such waveguides are known to the person skilled in the art as depressed cladding waveguides. While such waveguide designs support single-mode operation for small waveguide ring diameters, the waveguides become multi-moded for larger diameters. The person skilled in the art will understand that, for high power applications, single-mode operation and large mode diameters (>20 μm, preferably >30 μm) may be used.

Tracks may be arranged such that a closed contour is not obtained. In other words, the tracks may be spaced apart by a given distance. For example, the spacing between the tracks may be comparable to the individual track size. Tracks may be written in sub-groups of one to ten tracks. Within each sub-group the tracks may be placed proximate to each other, with separation comparable to the track size. This leads to an effective refractive index modification (lowering) over the area occupied by the group. The sub-groups may be separated by a larger distance (comparable to the size of the sub-group) to suppress higher-order mode propagation, similarly to the large-pitch leakage channel fiber designs known to the person skilled in the art.

Figure 2:
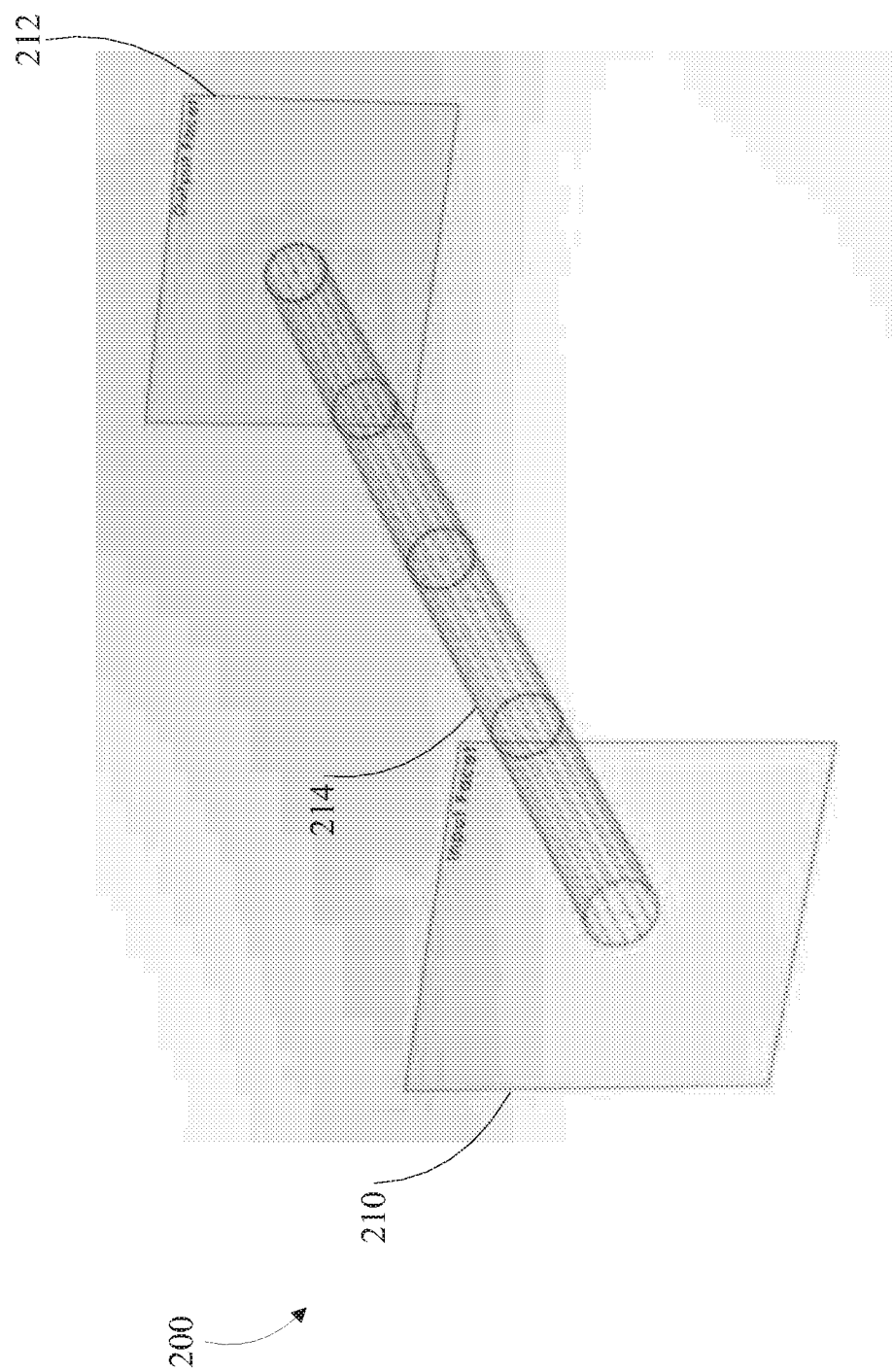
FIG. 2 depicts a single waveguide with a constant cross-section area in accordance with an embodiment of the disclosure.

FIG. 2 depicts a single waveguide comprising 15 laser written, modified tracks. The waveguide 214 in this example has a uniform cross-sectional area from the input facet 210 to the output facet 212.

Figure 3:
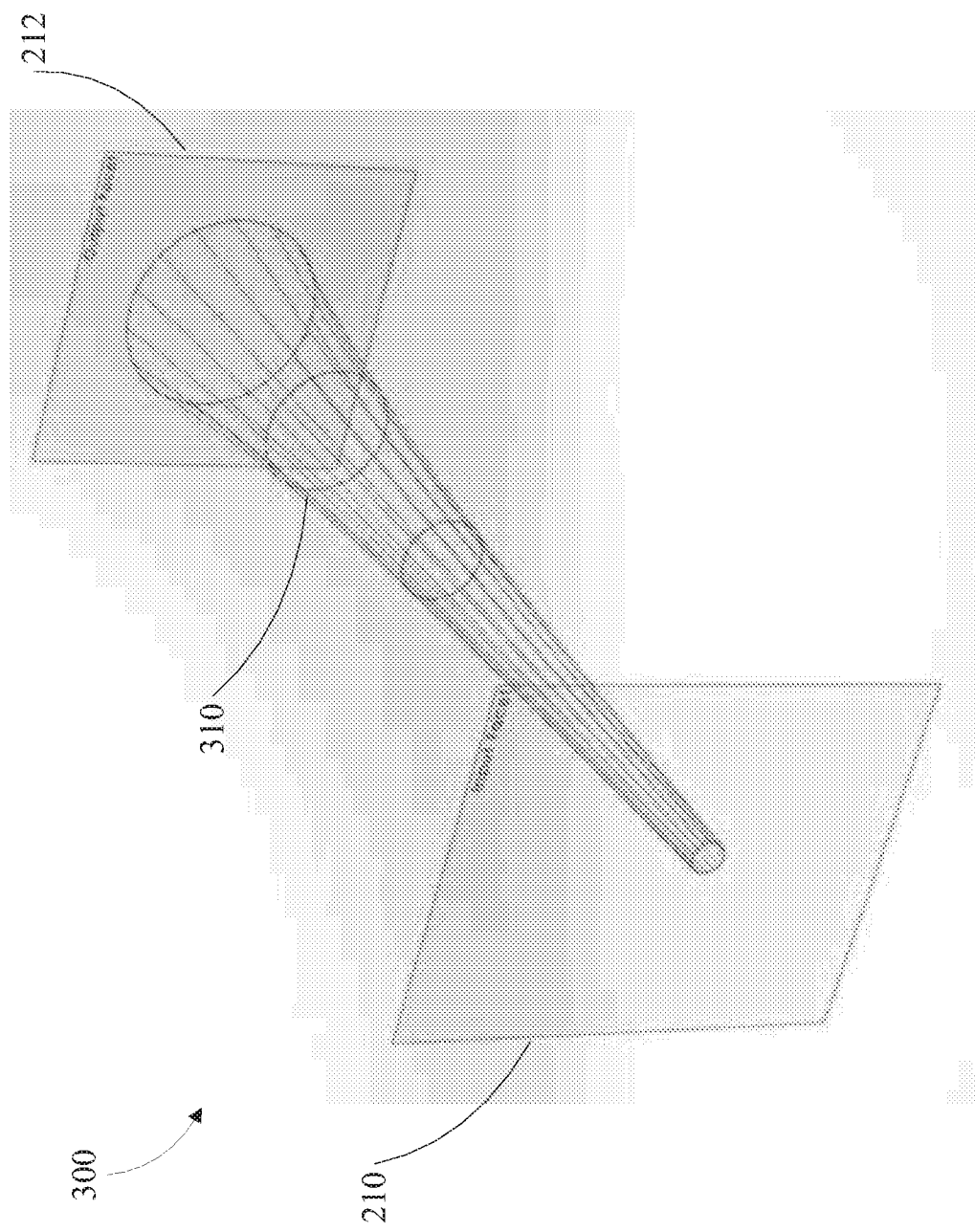
FIG. 3 depicts a single waveguide with a changing cross-section area in accordance with an embodiment of the disclosure.

FIG. 3 depicts a single waveguide comprising multiple laser written tracks. The waveguide 310 in this example has an increasing cross-sectional area from the input facet 210 to the output facet 212. This example demonstrates a change in the mode size along the length of the waveguide facilitated by the cross sectional area change. In another example, the size of the cross-sectional area (as an example of cross-sectional size) may decrease from the input facet 210 to the output facet 212. In general, in any of the disclosed embodiments and examples, the size of the cross-sectional area may vary from the input facet to the output facet, e.g., monotonously.

Figure 4:
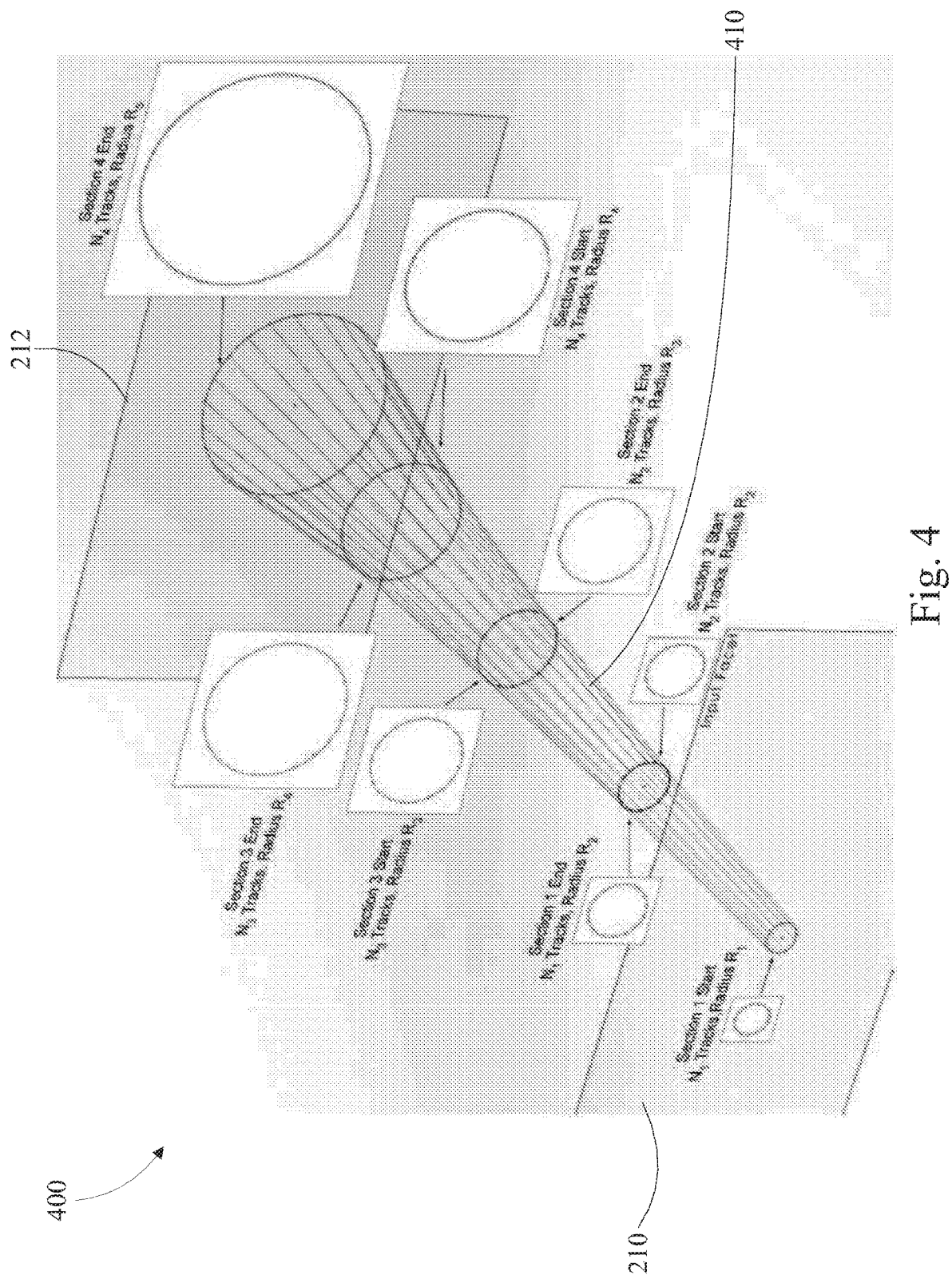
FIG. 4 depicts a single waveguide with a changing cross-sectional area and multiple sections each with constant track number in accordance with an embodiment of the disclosure.

FIG. 4 depicts a single waveguide comprising multiple sections of laser written tracks. The number of tracks in each section is constant but the cross sectional area varies. The waveguide 410 in this example has an overall increasing cross-sectional area from the input facet 210 to the output facet 212. This example demonstrates a change in the mode size along the length of the waveguide facilitated by the change in the number of tracks in each section and cross sectional area. This approach maintains a more constant distance between adjacent tracks as the cross-sectional area increases. In general, the number of tracks may be constant within each section but may be different between sections. For example, a first section may have a first track number (number of tracks) $N_1$ that is different from a second track number $N_2$ of a second section (distinct from the first section). In particular, the number of tracks $N_2$ of the second section may be larger than the number of tracks $N_1$ of the first section when the cross section (e.g., radius) $S_2$ of the second section is larger than the cross section (e.g., radius) $S_1$ of the first section, and vice versa. In general, the number of tracks and the size of the cross-sectional area may vary from the input facet to the output facet. The number of tracks may depend on the cross-sectional size (e.g., area). For example, the number of tracks may depend on the circumference (e.g., mean circumference) of the sections.

Figure 5:
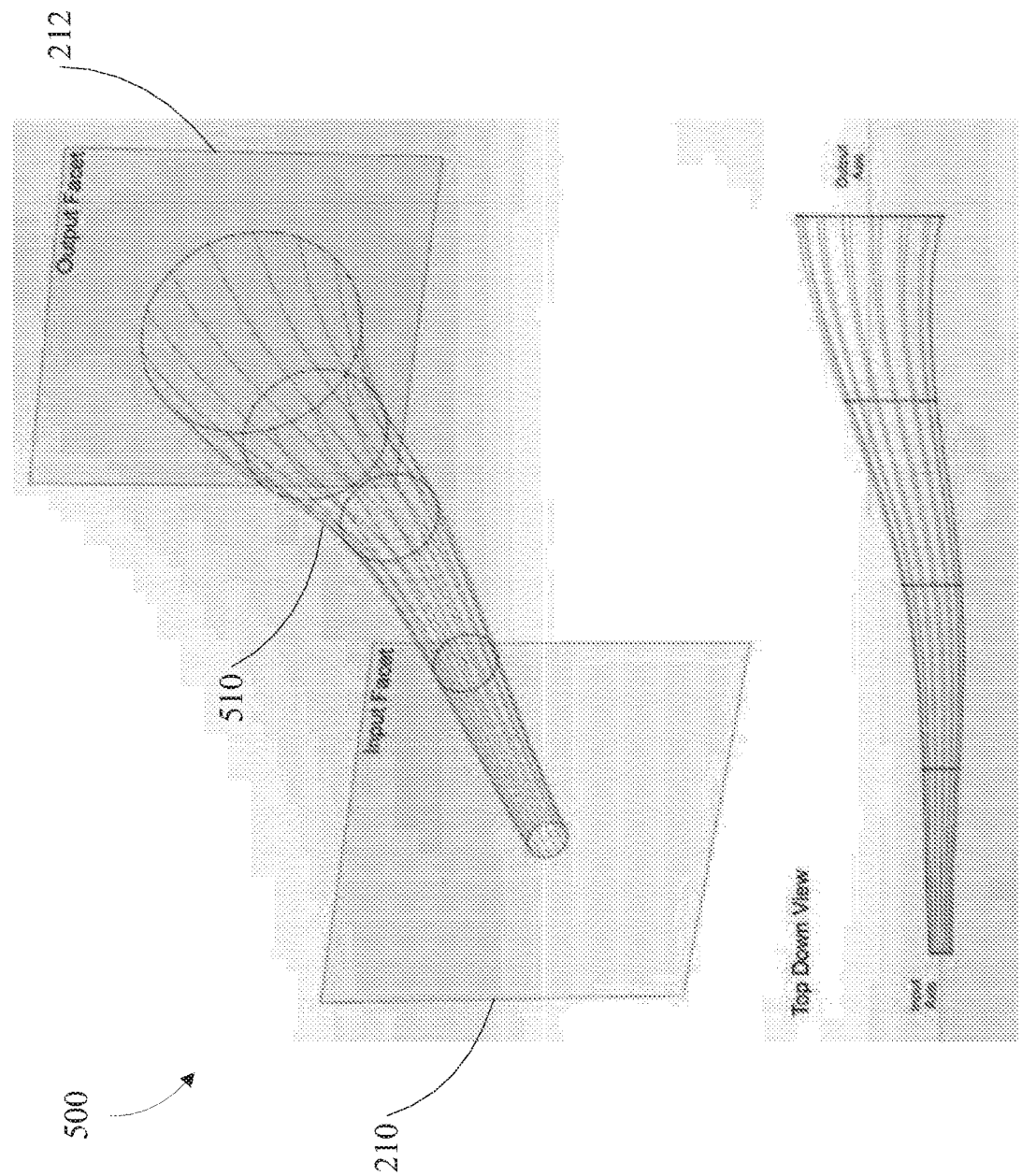
FIG. 5 depicts a single waveguide with a changing cross-section area and arbitrary routing in accordance with an embodiment of the disclosure.

FIG. 5 shows a single waveguide comprising multiple laser written tracks. The waveguide 510 in this example has an increasing cross-sectional area from the input facet 210 to the output facet 212 and the input facet and output facet are routed to different locations. This waveguide demonstrates arbitrary routing of the guided mode along the length of the waveguide. For example, a longitudinal axis of the waveguide at a first section of the waveguide and a longitudinal axis of the waveguide at a second section of the waveguide may not lie in the same plane. In general, in any of the disclosed embodiments and examples, the input facet and the output facet may be at different space locations using arbitrary three dimensional routing.

Figure 6:
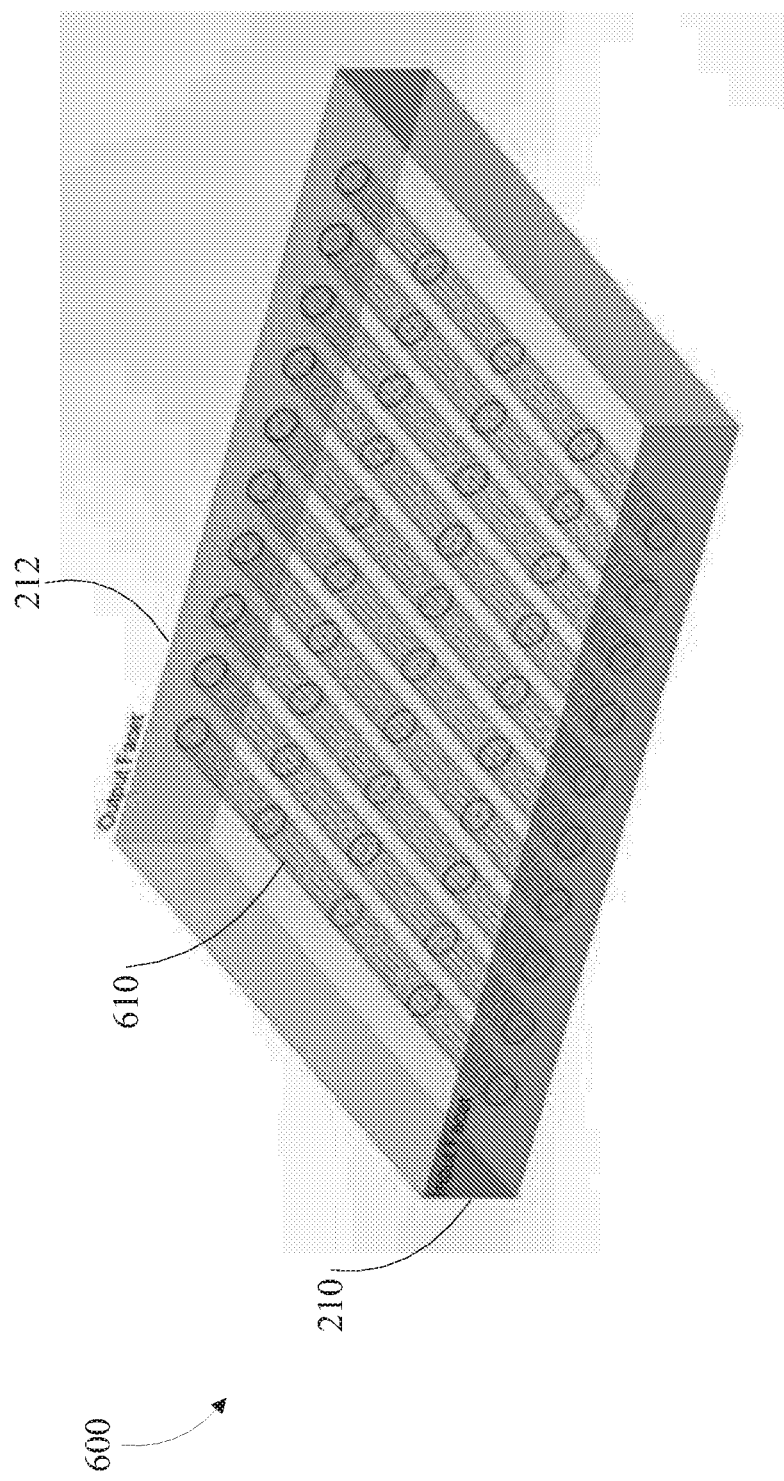
FIG. 6 depicts a set of ten optical channels in accordance with an embodiment of the disclosure.

FIG. 6 indicates waveguides 610 having ten optical channels between the input facet 210 and output facet 212. Each channel in this depiction is a straight waveguide made up of many laser written tracks but the routing for each channel and the cross section may be independently controlled along the length of the waveguide.

Figure 7:
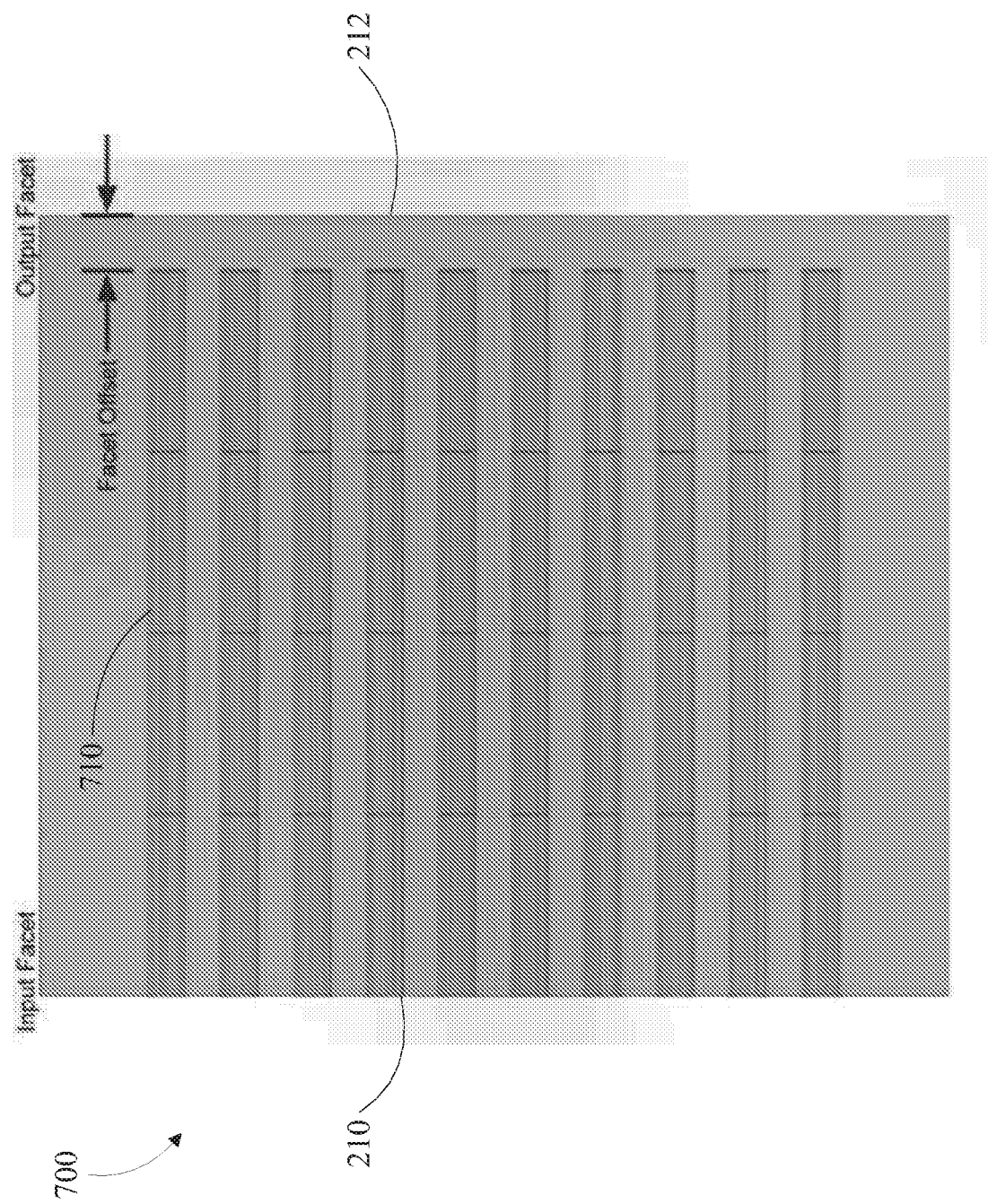
FIG. 7 depicts a set of ten optical channels with abrupt termination in accordance with an embodiment of the disclosure.

FIG. 7 depicts a top down view of a waveguides array 710 consisting of ten channels between the input facet 210 and the output facet 212. The channels have an abrupt termination point at a specified distance from the output facet 212 to allow for diffractive expansion of the mode towards the output facet 212. In general, in any of the disclosed embodiments and examples, the waveguide channel or the waveguide channels may have an abrupt termination with a facet offset from the output facet (i.e., within the optical substrate).

Figure 8:
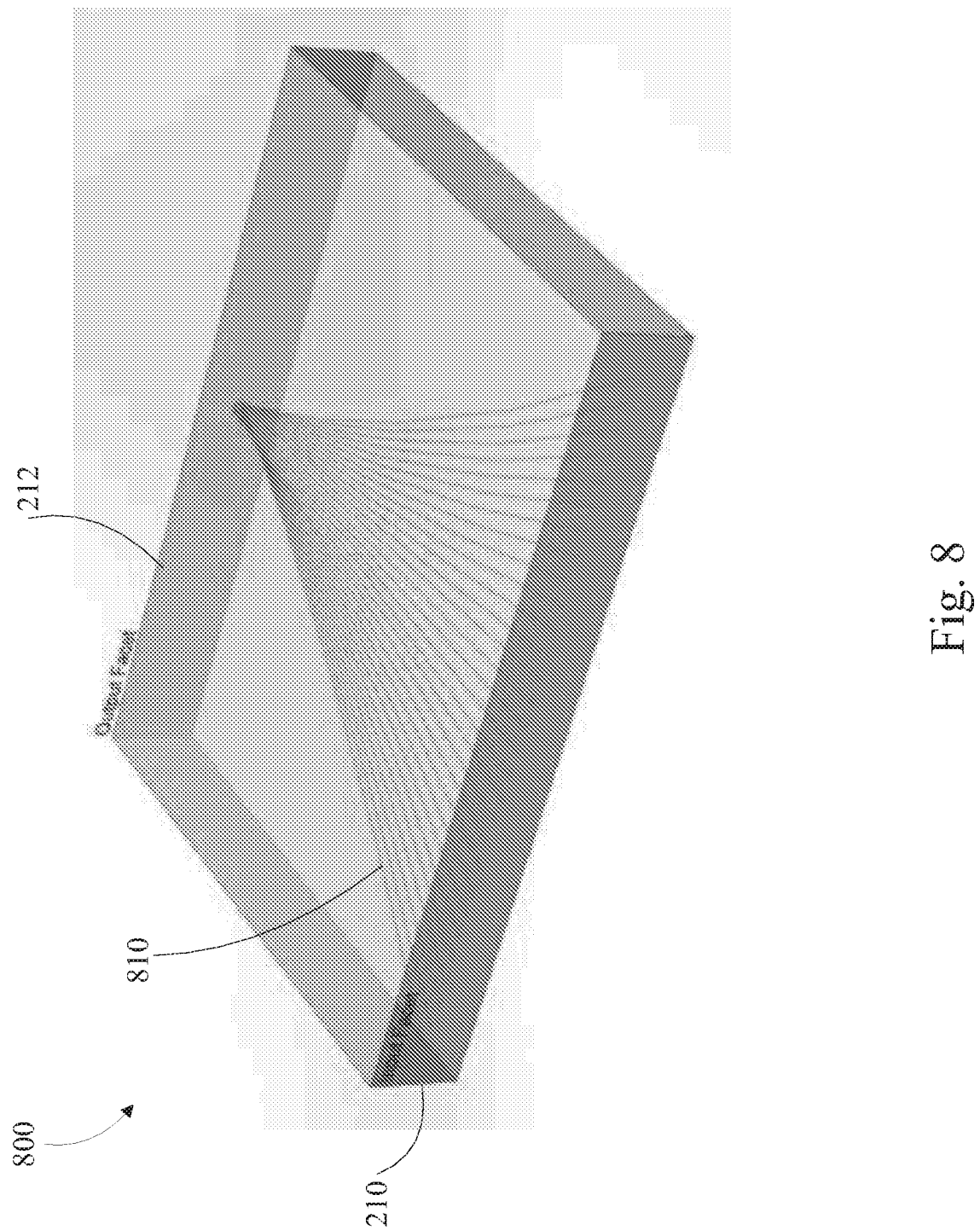
FIG. 8 depicts a set of thirty input channels to one output location in accordance with an embodiment of the disclosure.

FIG. 8 shows a waveguide array 810 consisting of many input channels routed to a single output. In this example, each spline represents a single waveguide which itself is made up of many laser written tracks consistent with the waveguide architectures discussed herein. The spatial grouping of the waveguides at the output may take many forms. For example, the inputs of the waveguides may be on a same line or a same plane. And in yet another example, the inputs of the waveguides may be on different planes. In general, in any of the disclosed embodiments and examples where a plurality of waveguides are present, the spatial grouping may take different forms.

Figure 9:
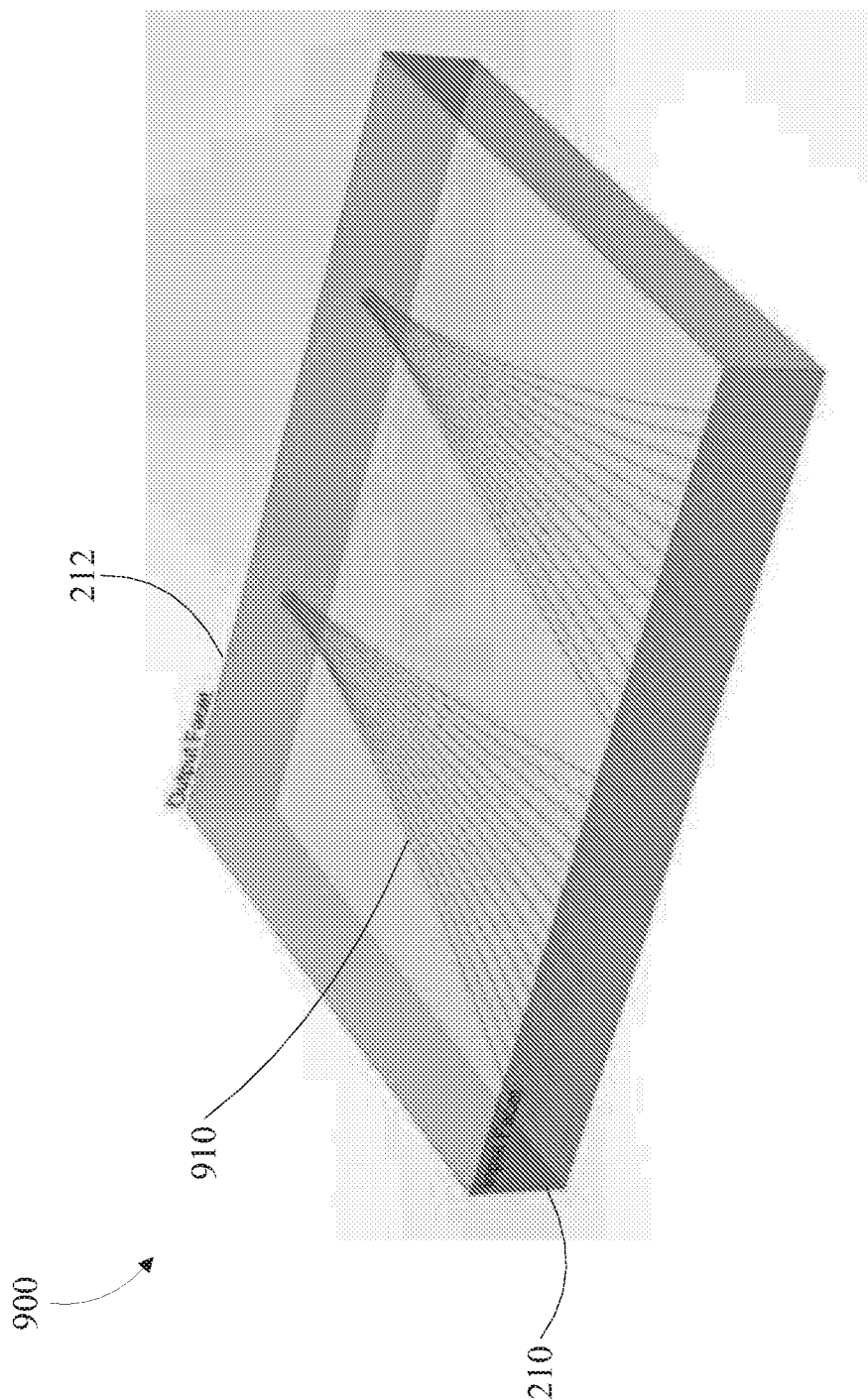
FIG. 9 depicts a set of thirty input channels to two output locations in accordance with an embodiment of the disclosure.

FIG. 9 indicates a waveguide array 910 having many input channels routed to two outputs. In this example, each spline represents a single waveguide which itself is made up of many laser written tracks consistent with the waveguide architectures discussed herein. The spatial grouping of the waveguides at the output may take many forms.

Figure 10:
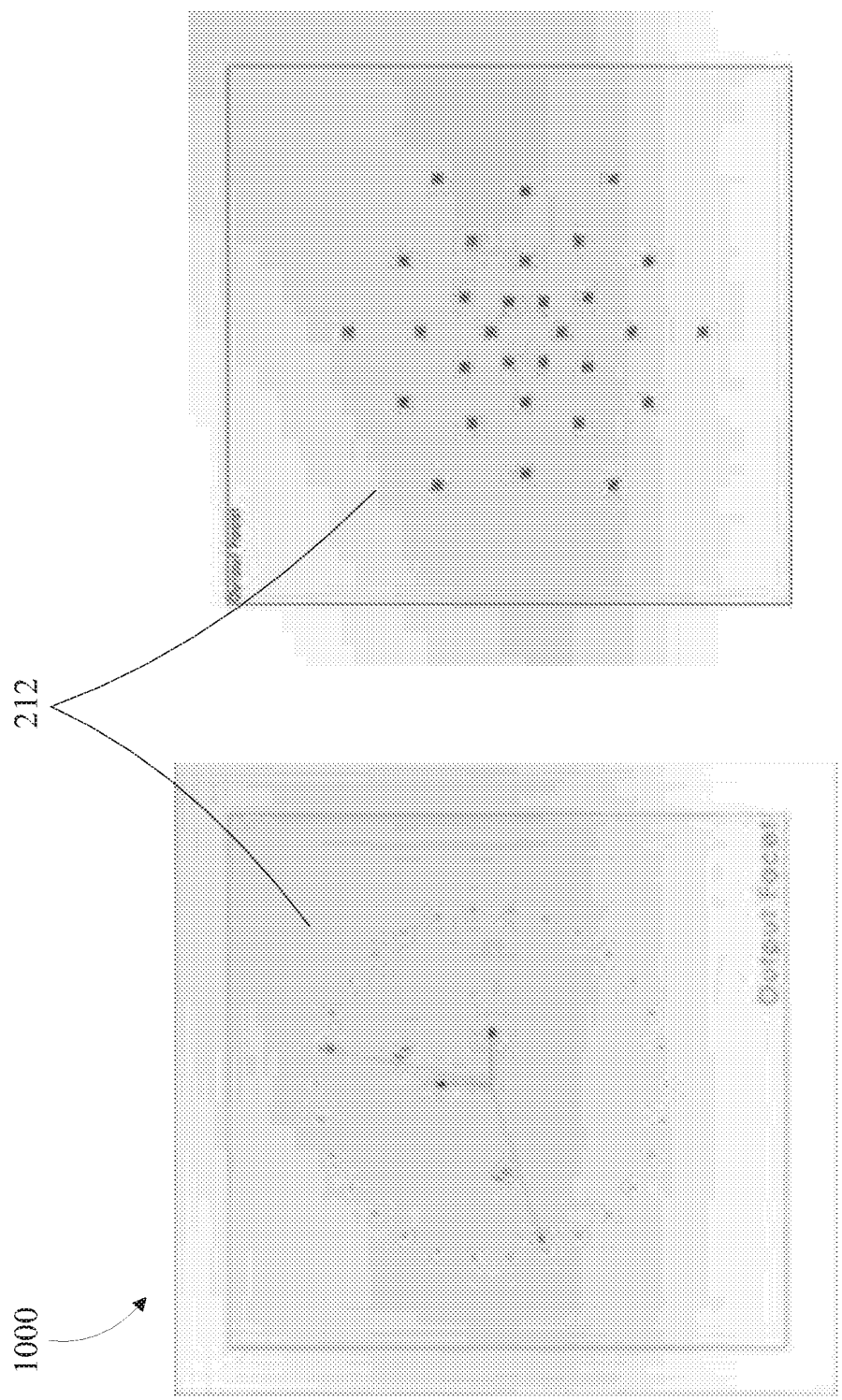
FIG. 10 depicts an output spatial grouping in accordance with an embodiment of the disclosure.

FIG. 10 depicts a cross-sectional view of the spatial grouping at an output location. In this example, each point represents a single waveguide which itself is made up of many laser written tracks consistent with the waveguide architectures discussed herein. The spatial grouping of the waveguides at the output may take many forms, such as a circle or a star configuration as shown.

Figure 11:
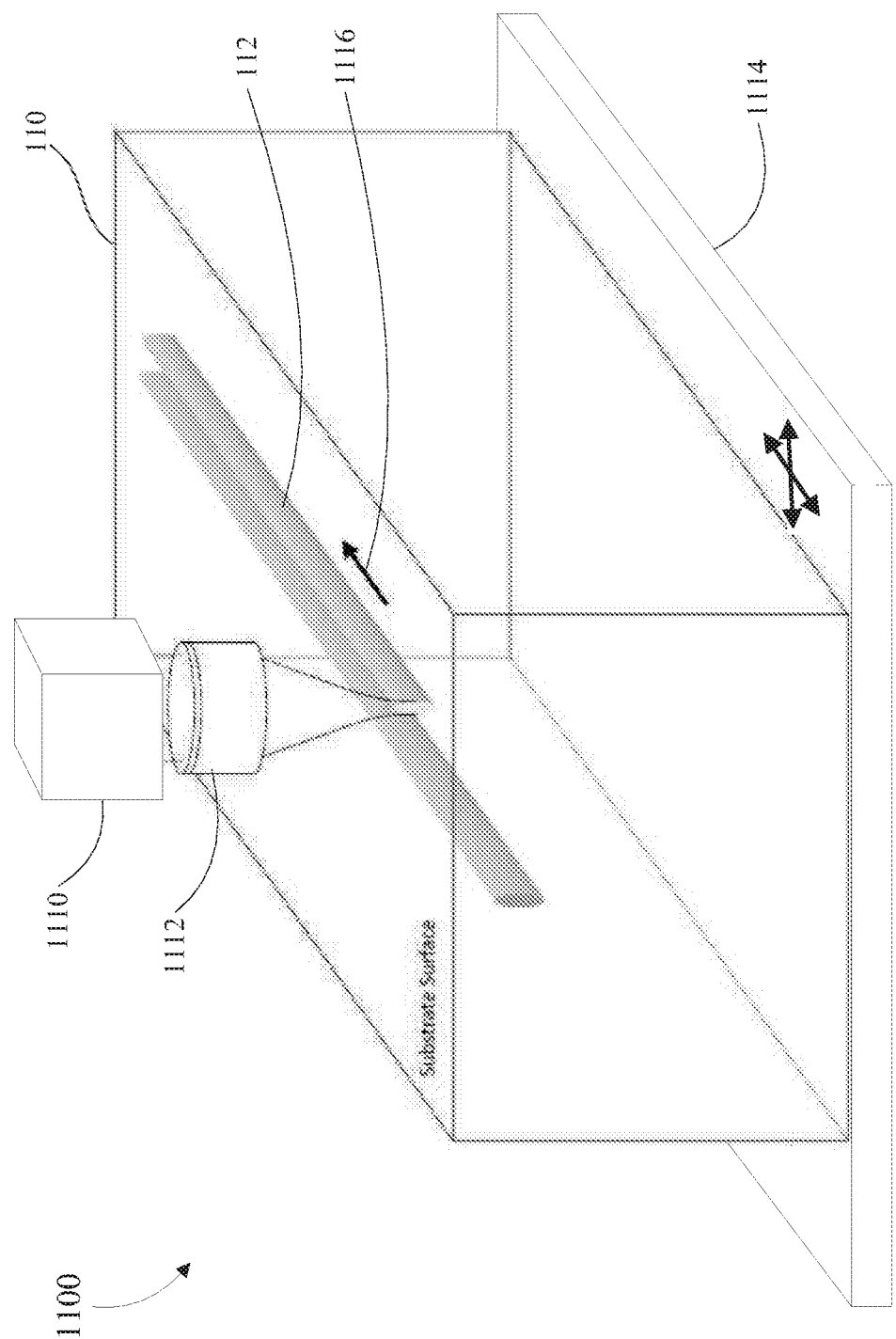
FIG. 11 depicts an example hardware embodiment in accordance with an embodiment of the disclosure.

FIG. 11 depicts an exemplary embodiment of target hardware for implementation of an embodiment of the present disclosure. A femtosecond laser 1110 beam is routed into an optical system 1112 for focusing the laser beam toward a substrate surface and into the focal volume inside the optical substrate 110. The optical substrate may be moved by an XY stage 1114. In this example one complete laser modified track 112 is written at a time from one end of an optical substrate to the other end by moving the stage in a direction shown by 1116. Modified tracks may be arranged in many different patterns, and may be regularly or non-regularly spaced. The tracks may be written starting at regions farthest away from the substrate surface 110 so that subsequently written tracks are written through unmodified substrate material. The laser modified track has been modified to lower the refractive index of the material.

Figure 12:
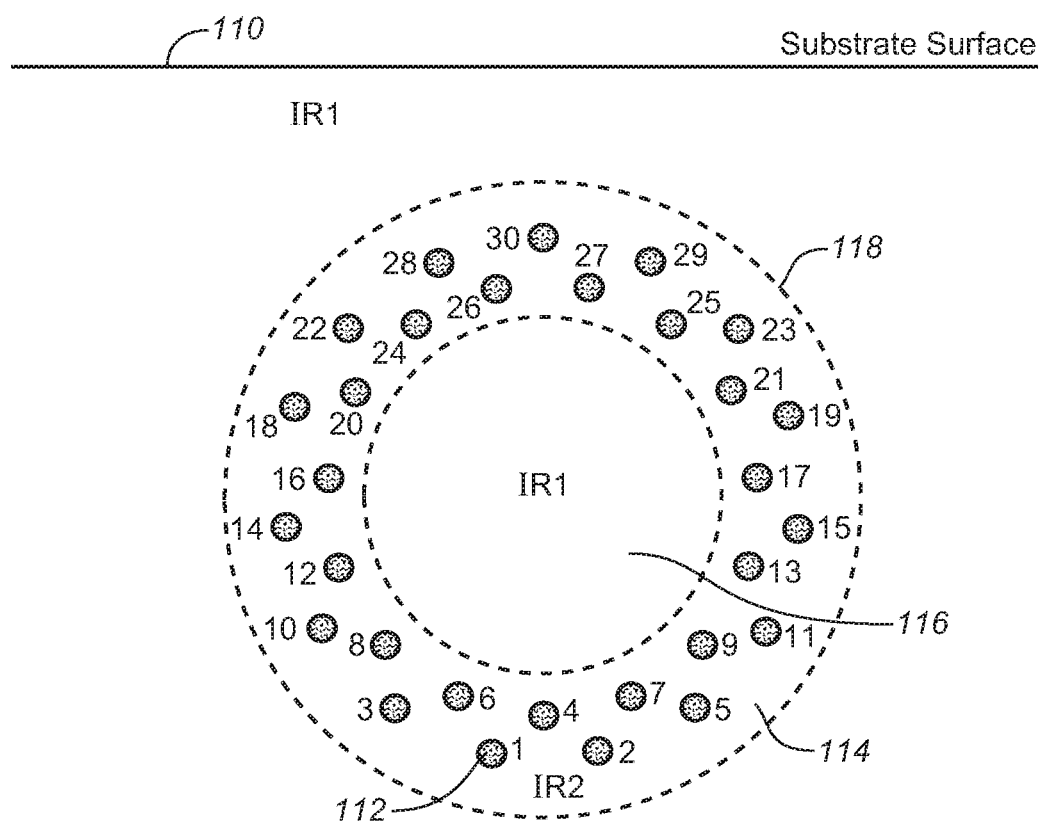
FIG. 12 depicts an example order of track creation in accordance with an embodiment of the disclosure.

FIG. 12 depicts one order of consecutive track writing of the laser modified tracks 112. In this example the laser tracks are written from bottom (furthest from the substrate surface) to top and left to right so that subsequent tracks are written through unmodified material. Tracks written in this way may be utilized for different types of cross-sections. It is also envisioned that the tracks may be written from different sides of the material simultaneously in order to reduce manufacturing time. If multiple different tracks from multiple different sides are written simultaneously, each of the tracks may be written in such a way as to write the tracks from that side starting at the farthest from that substrate surface so as to write subsequent tracks through unmodified material.

In some embodiments, the geometry of the waveguides of the present disclosure are configured to support single-mode operation. The processing parameters, including, but not limited to femtosecond laser processing parameters, are optimized for waveguide performance. Femtosecond laser processing parameters may comprise scan speed, overlap, number of passes, pulse length, repetition rate, wavelength, polarization, focusing conditions, and the like.

EQUIVALENTS, EXTENSIONS, ALTERNATIVES AND MISCELLANEOUS

Example embodiments that relate to laser written waveguides in optical substrates are thus described. In the foregoing specification, embodiments of the present disclosure have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense. Buried waveguide designs as described in the present disclosure may be constructed in an optical substrate. It is understood that such waveguides may be constructed on any optical material substrates including but not limited to, linear optical materials, nonlinear optical materials (for example, lithium tantalate, lithium niobate, KTP, BBO, LBO, BiBO, etc.), amorphous materials, crystalline materials or the like.

Various aspects of the present invention may be appreciated from the following enumerated example embodiments (EEEs), which are not claims.

EEE 1. A laser-written waveguide comprising:
   an optical substrate having a first refractive index;
   a plurality of laser-written tracks buried within said optical substrate and having a second refractive index lower than the first refractive index;
   one or more concentric geometric regions bounding said plurality of laser-written tracks; and
   a waveguide channel delimited by said concentric geometric regions, with a central unmodified region as a waveguide core, wherein said waveguide channel is configured to allow formation of an optical mode.
   Said concentric geometric regions may have a non-uniform cross-sectional size along a length of the waveguide channel EEE 2. The laser-written waveguide of EEE 1, wherein the laser-written tracks have a structure different from an unmodified structure of the optical substrate.

EEE 3. The laser-written waveguide of EEE 1, wherein said concentric geometric regions vary in size along a length.

EEE 4. The laser-written waveguide of EEE 1, wherein said waveguide has input and output locations which vary in two or three dimensions to accomplish three-dimensional routing of the optical mode.

EEE 5. A plurality of laser-written waveguides of EEE 1, wherein a set of one or more waveguide inputs are proximally arranged within a single spatial region.

EEE 6. A plurality of laser-written waveguides of EEE 1, wherein a set of one or more waveguide outputs are proximally arranged within a single spatial region.

EEE 7. The laser-written waveguide of EEE 1, wherein said waveguide channel has an abrupt termination point inside the substrate that is offset from an output facet.

EEE 8. The laser-written waveguide of EEE 1, wherein said waveguide channel converts a wavelength of an incoming optical signal.

EEE 9. A laser-written waveguide, comprising:
an optical substrate having a first refractive index;
a plurality of laser-written tracks buried beneath a surface of the optical substrate and having a second refractive index lower than the first refractive index;
one or more concentric geometric regions bounding the plurality of laser-written tracks; and
a waveguide channel delimited by said concentric geometric regions having a non-uniform cross-sectional size along a length of the waveguide channel, wherein said waveguide channel is configured to allow formation of an optical mode with varying mode size along the length.

EEE 10. The laser-written waveguide of EEE 9, wherein the laser-written tracks have a structure different from an unmodified structure of the optical substrate.

EEE 11. The laser-written waveguide of EEE 9, wherein said waveguide has input and output locations which vary in two or three dimensions to accomplish three-dimensional routing.

EEE 12. A plurality of laser-written waveguides of EEE 9, wherein a set of one or more waveguide inputs are proximally arranged within a single spatial region.

EEE 13. A plurality of laser-written waveguides of EEE 9, wherein a set of one or more waveguide outputs are proximally arranged within a single spatial region.

EEE 14. The laser-written waveguide of EEE 9, wherein said waveguide channel has an abrupt termination point inside the substrate that is offset from an output facet.

EEE 15. The laser-written waveguide of EEE 9, wherein said waveguide channel converts a wavelength of an incoming optical signal.

EEE 16. A laser-written waveguide, comprising:
an optical substrate having a first refractive index;
a plurality of laser-written tracks buried inside of the optical substrate and having a second refractive index lower than the first refractive index;
one or more concentric geometric regions bounding the plurality of laser-written tracks; and
a waveguide channel delimited by said concentric geometric regions having a non-uniform cross-sectional size and three dimensional routing along a length of the waveguide channel, wherein said waveguide channel is configured to allow formation of an optical mode with varying mode size along the length.

EEE 17. The laser-written waveguide of EEE 16, wherein the laser-written tracks have a structure different from an unmodified structure of the optical substrate.

EEE 18. A plurality of laser-written waveguides of EEE 16, wherein a set of one or more waveguide inputs are proximally arranged within a single spatial region.

EEE 19. A plurality of laser-written waveguides of EEE 16, wherein a set of one or more waveguide outputs are proximally arranged within a single spatial region.

EEE 20. The laser-written waveguide of EEE 16, wherein said waveguide channel has an abrupt termination point inside the substrate that is offset from an output facet.

EEE 21. The laser-written waveguide of EEE 16, wherein said waveguide channel converts a wavelength of an incoming optical signal.

EEE 22. A laser-written waveguide, comprising:
an optical substrate having a first refractive index;
a plurality of laser-written tracks buried beneath a surface of the optical substrate and having a second refractive index lower than the first refractive index;
one or more concentric geometric regions bounding the plurality of laser-written tracks; and
a waveguide channel delimited by said concentric geometric regions having a non-uniform cross-sectional size and multiple sections each with a constant track number along a length, wherein said waveguide channel is configured to allow formation of an optical mode with varying mode size along the length and having predetermined input and output locations.

EEE 23. The laser-written waveguide of EEE 22, wherein the laser-written tracks have a structure different from an unmodified structure of the optical substrate.

EEE 24. A plurality of laser-written waveguides of EEE 22, wherein a set of one or more waveguide inputs are proximally arranged within a single spatial region.

EEE 25. A plurality of laser-written waveguides of EEE 22, wherein a set of one or more waveguide outputs are proximally arranged within a single spatial region.

EEE 26. The laser-written waveguide of EEE 22, wherein said waveguide channel has an abrupt termination point inside the substrate that is offset from an output facet.

EEE 27. The laser-written waveguide of EEE 22, wherein said waveguide channel converts a wavelength of an incoming optical signal.

EEE 28. A laser-written waveguide, comprising:
an optical substrate having a first refractive index;
a plurality of laser-written tracks buried within the optical substrate and having a second refractive index lower than the first refractive index; and
one or more polygonal or elliptical concentric geometric regions bounding the plurality of laser-written tracks and a waveguide channel delimited by said concentric geometric regions, wherein said waveguide channel is configured to allow formation of an optical mode.

EEE 29. A laser-written waveguide, comprising:
an optical substrate having a first refractive index;
a plurality of laser-written tracks buried beneath a surface of the optical substrate having a second refractive index lower than the first refractive index and an abrupt ending point offset from a facet of the optical substrate; and
one or more concentric rings bounding the plurality of laser-written tracks and a waveguide channel delimited by said concentric rings, wherein said waveguide channel is configured to allow formation of an optical mode with an abrupt termination of the optical mode at a designed location before the facet of the optical substrate.

What is claimed is:
1. A laser-written waveguide comprising:
an optical substrate having a first refractive index;
a plurality of laser-written tracks buried within said optical substrate and having a second refractive index lower than the first refractive index;
one or more concentric geometric regions bounding said plurality of laser-written tracks; and a waveguide channel delimited by said concentric geometric regions, with a central unmodified region as a waveguide core, wherein said waveguide channel is configured to allow formation of an optical mode, wherein said concentric geometric regions have a non-uniform cross-sectional size along a length of the waveguide channel.

2. The laser-written waveguide of claim 1, wherein said concentric geometric regions vary in size along a length.

3. The laser-written waveguide of claim 1, wherein the laser-written tracks have a structure different from an unmodified structure of the optical substrate.

4. The laser-written waveguide of claim 1, wherein said waveguide has input and output locations which vary in two or three dimensions to accomplish three-dimensional routing of the optical mode.

5. The laser-written waveguide of claim 1, wherein said waveguide channel converts a wavelength of an incoming optical signal.

6. The laser-written waveguide of claim 1, wherein said waveguide channel has an abrupt termination point inside the substrate that is offset from an output facet.

7. The laser-written waveguide of claim 1, wherein said waveguide channel is configured to allow formation of an optical mode with varying mode size along the length.

8. A plurality of laser-written waveguides of claim 1, wherein a set of one or more waveguide inputs are proximally arranged within a single spatial region and a set of one or more waveguide outputs are proximally arranged within another single spatial region.

9. A laser-written waveguide, comprising:
an optical substrate having a first refractive index;
a plurality of laser-written tracks buried within the optical substrate and having a second refractive index lower than the first refractive index; and
one or more polygonal or elliptical concentric geometric regions bounding the plurality of laser-written tracks and a waveguide channel delimited by said concentric geometric regions, wherein said waveguide channel is configured to allow formation of an optical mode,
wherein said concentric geometric regions have a non-uniform cross-sectional size along a length of the waveguide channel.

10. The laser-written waveguide of claim 9, wherein the laser-written tracks have a structure different from an unmodified structure of the optical substrate.

11. The laser-written waveguide of claim 9, wherein said waveguide channel converts a wavelength of an incoming optical signal.

12. The laser-written waveguide of claim 9, wherein said waveguide channel has an abrupt termination point inside the substrate that is offset from an output facet.

13. The laser-written waveguide of claim 9, wherein said waveguide has input and output locations which vary in two or three dimensions to accomplish three-dimensional routing of the optical mode.

14. A plurality of laser-written waveguides of claim 9, wherein a set of one or more waveguide inputs are proximally arranged within a single spatial region and a set of one or more waveguide outputs are proximally arranged within another single spatial region.

* * * * *